United States Patent [19]

Desai et al.

[11] Patent Number: 5,781,703
[45] Date of Patent: Jul. 14, 1998

[54] INTELLIGENT REMOTE AGENT FOR COMPUTER PERFORMANCE MONITORING

[75] Inventors: Arun K. Desai, Thousand Oaks; Scott Alan Bendar, Westlake Village; Gregory William Modster, Los Angeles, all of Calif.

[73] Assignee: Candle Distributed Solutions, Inc., Santa Monica, Calif.

[21] Appl. No.: 708,234

[22] Filed: Sep. 6, 1996

[51] Int. Cl.[6] ................................................ G06F 11/34
[52] U.S. Cl. ............................................................. 395/54
[58] Field of Search ........................ 364/DIG. 1, DIG. 2; 340/825.07; 345/148, 502; 348/571; 370/396; 395/200.32, 200.33, 200.53, 200.54, 200.49, 200.55, 200.56, 200.67, 200.52, 677, 671, 684, 680, 681; 707/1, 102, 103; 704/200

[56] References Cited

U.S. PATENT DOCUMENTS

| | | | |
|---|---|---|---|
| 4,423,414 | 12/1983 | Bryant et al. | 340/825.07 |
| 4,630,196 | 12/1986 | Bebnar, Jr. et al. | 395/200.32 |
| 4,800,488 | 1/1989 | Agrawal et al. | 395/200.55 |
| 4,949,248 | 8/1990 | Caro | 395/200.33 |
| 5,005,122 | 4/1991 | Griffin et al. | 395/200.33 |
| 5,036,459 | 7/1991 | den Haan et al. | 395/200.67 |
| 5,109,486 | 4/1992 | Seymour | 395/200.54 |
| 5,129,081 | 7/1992 | Kobayashi et al. | 707/1 |
| 5,133,053 | 7/1992 | Johnson et al. | 395/200.53 |
| 5,165,018 | 11/1992 | Simor | 395/200.52 |
| 5,187,787 | 2/1993 | Skeen et al. | 395/680 |
| 5,212,778 | 5/1993 | Dally et al. | 348/571 |
| 5,212,792 | 5/1993 | Gerety et al. | 345/148 |
| 5,265,250 | 11/1993 | Andrade et al. | 395/671 |
| 5,267,235 | 11/1993 | Thacker | 370/396 |
| 5,301,280 | 4/1994 | Schwartz et al. | 395/200.67 |
| 5,307,484 | 4/1994 | Baker et al. | 707/102 |
| 5,307,490 | 4/1994 | Davidson et al. | 395/684 |
| 5,321,808 | 6/1994 | Rupp | 345/502 |
| 5,327,559 | 7/1994 | Priven et al. | 395/200.33 |
| 5,329,619 | 7/1994 | Page et al. | 395/671 |
| 5,335,347 | 8/1994 | Foss et al. | 395/680 |
| 5,341,477 | 8/1994 | Pitkin et al. | 395/200.56 |
| 5,341,499 | 8/1994 | Doragh | 395/681 |
| 5,355,453 | 10/1994 | Row et al. | 395/200.49 |
| 5,381,534 | 1/1995 | Shi | 395/200.33 |
| 5,384,890 | 1/1995 | Anderson et al. | 704/200 |
| 5,421,015 | 5/1995 | Khoyi et al. | 395/677 |
| 5,446,885 | 8/1995 | Moore et al. | 707/103 |

FOREIGN PATENT DOCUMENTS

| | | |
|---|---|---|
| 0 259 224 | 3/1988 | European Pat. Off. |
| 2232763 | 9/1990 | Japan. |

OTHER PUBLICATIONS

Richard Snodgrass, "A Relational Approach to Monitoring Complex Sytems", *ACM Transactions on Computer Systems*, vol. 6, No. 2, May 1988, pp. 157–196.

Author Unknown, Method to Centralize Maintenance Activity of a Performance Database:, *IBM Technical Disclosure Bulletin*, vol. 35, No. 2, Jul. 1992, pp. 364–368.

Edelstein, Herb, Application Strategies (Tutorial), Supplier No. 1253719, "Using Stored Procedures and Triggers", Sep. 1992, M&T Publishing Inc., DBMS, vol. 5, No. 10, 8-pages.

*Primary Examiner*—Robert B. Harrell
*Attorney, Agent, or Firm*—Merchant, Gould, Smith, Edell, Welter, & Schmidt

[57] ABSTRACT

A network monitoring system for a network interconnecting a plurality of computer systems, wherein the network monitoring system is comprised of one or more Intelligent Remote Agents, a Data Server, and a Proxy Controller. The Intelligent Remote Agents receive commands instructing them to collect performance data on the Agent's associated computer system, wherein the commands comprise predicates for filtering the performance data and a sampling interval or event occurrence. The Data Server generates requests for performance data and stores the collected performance data returned in response to the requests. The Proxy Controller translates the requests generated by the Data Server into the commands for the Intelligent Remote Agents. The Proxy Controller also transmits the commands to the Intelligent Remote Agents, accumulates the collected performance data returned from the Intelligent Remote Agents, and forwards the collected performance data to the Data Server for storage therein.

78 Claims, 4 Drawing Sheets

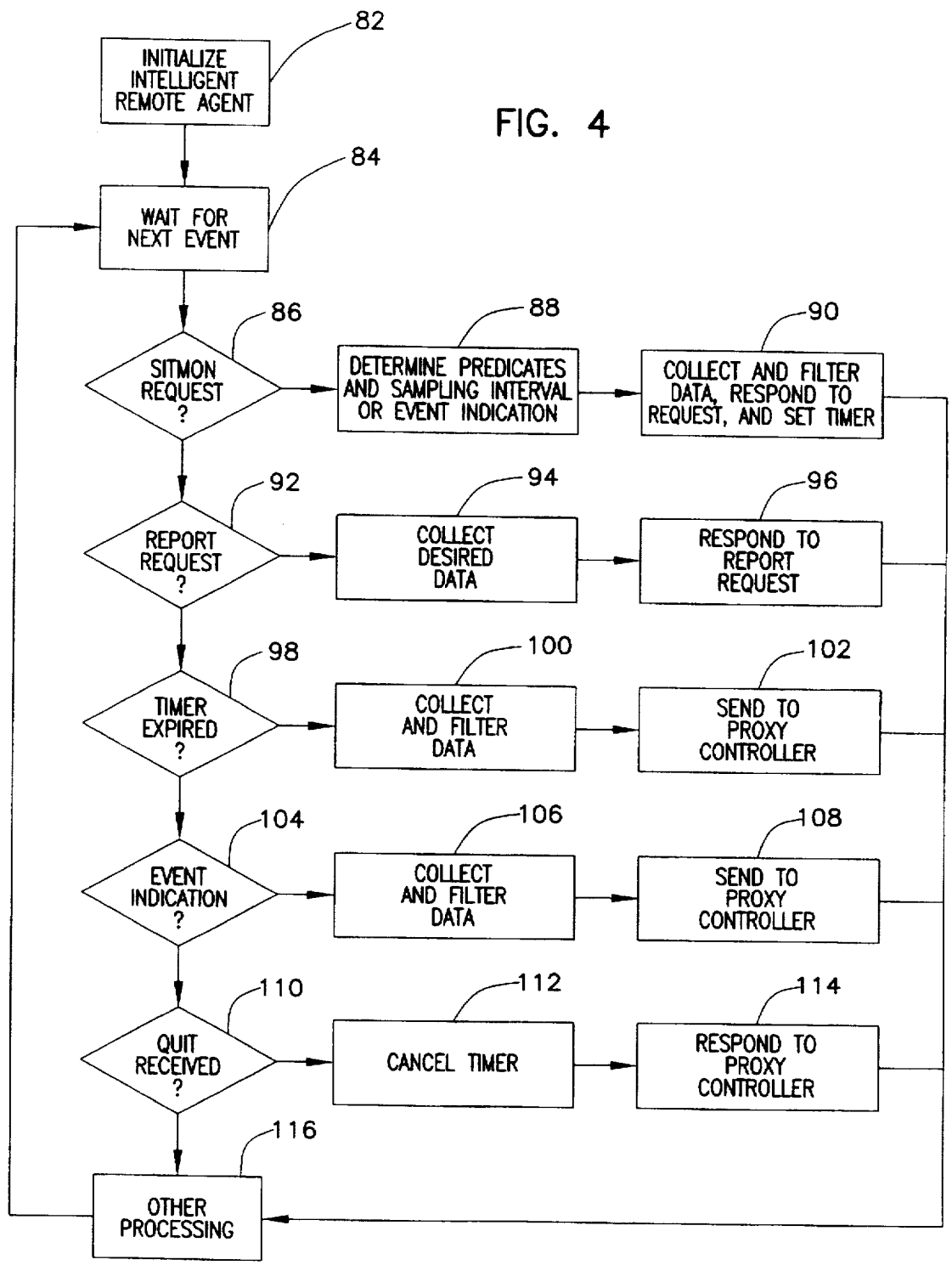

INTELLIGENT REMOTE AGENT FOR COMPUTER PERFORMANCE MONITORING

CROSS-REFERENCE TO RELATED APPLICATIONS

This is application is related to:

Application Ser. No. 08/660,730, entitled "OBJECT PROCEDURE MESSAGING FACILITY," filed Jun. 10, 1996, by Aubrey Chernick, et al., still pending.

Application Ser. No. 08/653,106 entitled "OBJECT PROCEDURE MESSAGING FACILITY," filed May 24, 1996, by Aubrey Chernick, et al., still pending.

Application Ser. No. 08/494,831, entitled "DATA SERVER WITH EVENT DRIVEN SAMPLING," filed Jun. 23, 1995, by Sam Greenblatt, et al., still pending.

Application Ser. No. 08/264,403, entitled "EVENT DRIVEN SAMPLING," filed Jun. 23, 1994, by Alex Yung, now U.S. Pat. No. 5,615,359, issued Mar. 25, 1997, all of which applications are incorporated by reference herein.

BACKGROUND OF THE INVENTION

1. Field of the Invention

This invention relates in general to techniques for monitoring the performance of computer networks, and in particular, to database techniques for collecting and managing performance data from computers in a network.

2. Description of Related Art

In conventional computer performance monitoring applications, the monitoring application generates a request for data, such as "How busy is the CPU?". This request is sent by the monitoring application to a data subsystem having such information via the network transport system. The data subsystem returns the information requested to the monitoring application which then processes the data as required. Conventional data subsystems, such as relational databases, maintain the data to be requested in tables. Some types of data, such as network monitoring data, are often processed using predicate logic to compare the data against a predetermined threshold. Such comparisons are typically performed by rule based testing.

The systems to be monitored often include complex computer networks that may include, inter alia, mainframes, minicomputers, workstations, etc. The information to be monitored continuously becomes more complicated so that there are enormous amounts of information to be analyzed. In order to reduce the amount of data to be reviewed by the system operators, some techniques have been developed to further filter the data before it is reviewed by the operator. One example is the display by exception technique once the data has been collected, wherein the internal logic of the system displays data to the operator in accordance with a predicate logic test. The data that has been retrieved is compared to a predetermined predicate or threshold level and is displayed to the operator if and only if the data exceeds the predicate or threshold.

As the computer network systems to be monitored grow in size and complexity, the data to be monitored and tested grows the same way. What are needed are improvements in the structure of database systems and monitoring applications to reduce the substantial computational time, and other overhead requirements, of conventional monitoring applications.

SUMMARY OF THE INVENTION

To overcome the limitations in the prior art described above, and to overcome other limitations that will become apparent upon reading and understanding the present specification, the present invention discloses a network monitoring system for a network interconnecting a plurality of computer systems, wherein the network monitoring system is comprised of one or more Intelligent Remote Agents, a Data Server, and a Proxy Controller. The Intelligent Remote Agents receive commands instructing them to collect performance data on the Agent's associated computer system, wherein the commands comprise predicates for filtering the performance data and a sampling interval or event occurrence. The Data Server generates requests for performance data and stores the collected performance data returned in response to the requests. The Proxy Controller translates the requests generated by the Data Server into the commands for the Intelligent Remote Agents. The Proxy Controller also transmits the commands to the Intelligent Remote Agents, accumulates the collected performance data returned from the Intelligent Remote Agents, and forwards the collected performance data to the Data Server for storage therein.

BRIEF DESCRIPTION OF THE DRAWINGS

Referring now to the drawings in which like reference numbers represent corresponding parts throughout:

FIGS. 2, 3, 4 are flow charts illustrating the structure and logic for each of the components, wherein FIG. 2 represents the steps performed by the Data Server, FIG. 3 represents the steps performed by the Proxy Controller, and FIG. 4 represents the steps performed by the Intelligent Remote Agent.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

Figure 1:
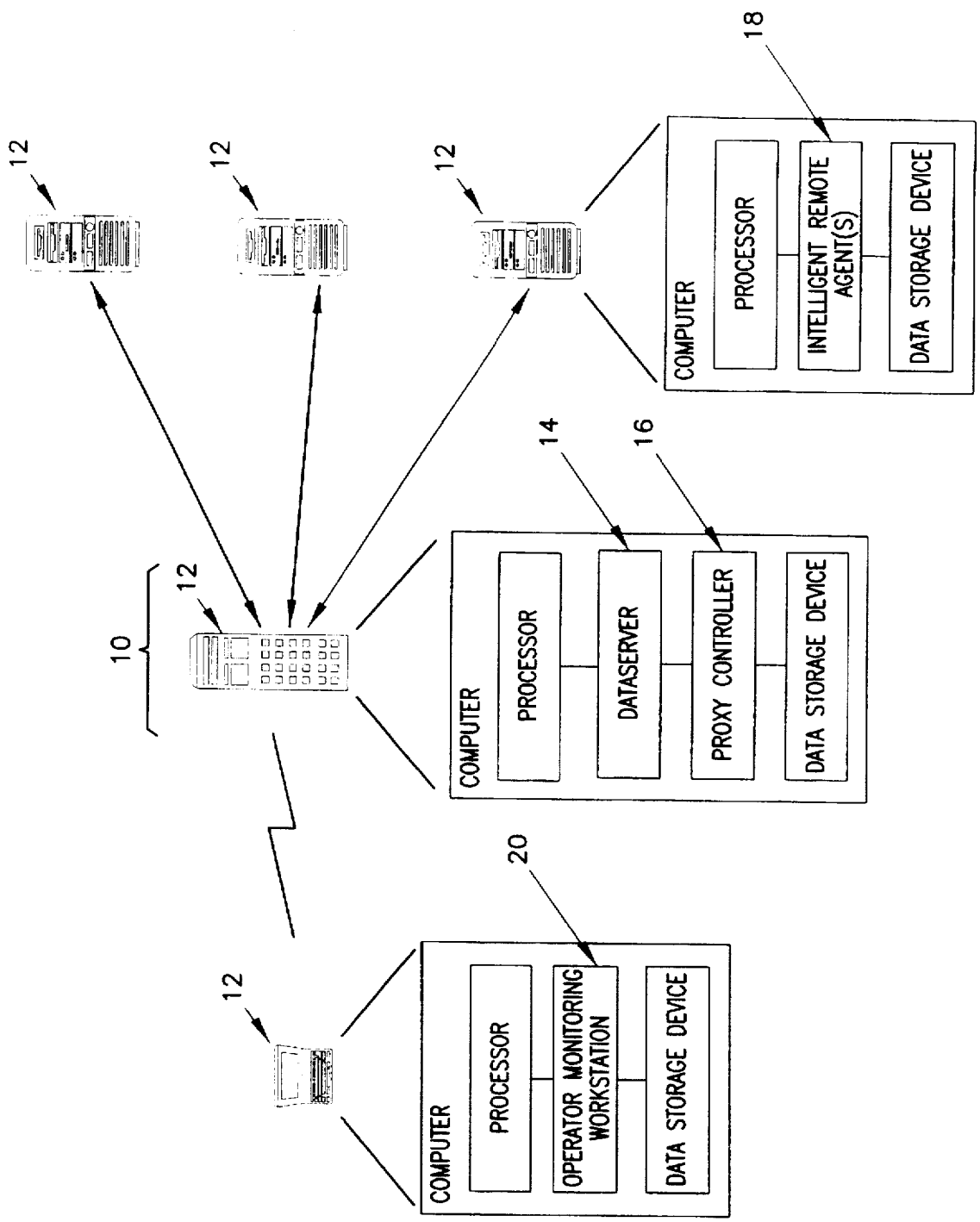
FIG. 1 is a block diagram that illustrates an exemplary hardware environment for the present invention.

FIG. 1 is a block diagram that illustrates an exemplary hardware environment for the present invention. The present invention is typically implemented using a computer network 10, which includes a plurality of interconnected computer systems 12, each of which may comprise mainframes, minicomputers, workstations, LAN servers, personal computers, etc., and each of which may execute any number of different application programs. Those skilled in the art will recognize that the exemplary environment illustrated in FIG. 1 is not intended to limit the present invention. Indeed, those skilled in the art will recognize that other alternative hardware environments may be used without departing from the scope of the present invention.

The present invention is a network 10 monitoring system comprised of Data Servers 14, Proxy Controllers 16, and Intelligent Remote Agents 18. Although only an exemplary configuration of Data Servers 14, Proxy Controllers 16, and Intelligent Remote Agents 18 is illustrated in FIG. 1, those skilled in the art will recognize that any number of such components may be used in accordance with the present invention.

Generally, the Data Servers 14, Proxy Controllers 16, and Intelligent Remote Agents 18 comprise computer programs that are tangibly embodied in or readable from a computer-readable medium or carrier, e.g. fixed and/or removable data storage and/or data communication devices. These computer programs may be retrieved from such devices into the random access memory of one or more of the computer systems 12 for execution. These computer programs comprise instructions which, when read and executed by a computer system 12, cause the computer system 12 to perform the steps necessary to execute the steps or elements of the present invention.

DATA SERVER

The Data Server 14 collects and stores performance data from one or more computer systems 12 in the network 10. In the preferred embodiment, a relational database model is described, although persons of ordinary skill in the art could easily use other types of databases. As a relational database, the Data Server 14 is equipped with one or more data retrieval engines, such as those using conventional structured query language (SQL) statements. Data is stored in the Data Server 14 and retrieved therefrom by one or more application programs, including those executing on an operator monitoring workstation 20.

Each Data Server 14 may be located on any of the computer systems 12 or on a specialized computer system 12 which is linked with networked computer systems 12 by the network 10. Preferably, if there are multiple Data Servers 14 in the computer network 10, one of them is designated a Hub Data Server 14 that centrally manages and/or accumulates data from the other Data Servers 14.

Any application program may direct data and instructions to and from the Data Server 14 for storage and/or retrieval therein. Thereafter, by submitting an appropriate inquiry, such as an SQL statement, any application program may request the retrieval of such data in the Data Server 14.

PROXY CONTROLLER

The Proxy Controller 16 works in conjunction with the Data Server 14, and provides communication services with the Intelligent Remote Agents 18. The Proxy Controller 16 also translates requests received from the Data Server 14 into commands for the Intelligent Remote Agents 18, collects data from the Intelligent Remote Agents 18, and forwards the data to the Data Server 14 for storage therein.

In the present invention, Data Servers 14, Proxy Controllers 16, and Intelligent Remote Agents 18 are organized by "cell", wherein a cell refers to a collection of related Data Servers 14, Proxy Controllers 16, and Intelligent Remote Agents 18. There can be any number of Intelligent Remote Agents 18 in any particular cell, but only one Data Server 14 and Proxy Controller 16. A cell is referred to by a symbolic name, which is typically assigned by an operator or administrator, but may be assigned automatically by default.

Upon initialization, a Proxy Controller 16 registers with a global location broker (not shown) using the name of the cell it was given or a default name if none is specified, wherein the global location broker may be a process, a file, or a table (including a table stored in the Data Server 14). The Proxy Controller 16 then waits for requests from the Data Server 14 or for requests or responses from an Intelligent Remote Agent 18.

INTELLIGENT REMOTE AGENTS

The Intelligent Remote Agents 18 communicate with the Proxy Controller 16, and through it the Data Server 14, for the collection of performance data from the computer systems 12. Many Intelligent Remote Agents 18 can communicate with the same Proxy Controller 16 and Data Server 14, thereby providing scalability for the present invention.

An Intelligent Remote Agent 18 receives commands from a Proxy Controller 16 associated with the Data Server 14, as described in more detail below. In response to such commands, the Intelligent Remote Agent 18 initiates data collection operations on its respective computer system 12, and then returns the collected data to the Proxy Controller 16 for forwarding to the Data Server 14. Thereafter, the collected data may be transmitted to an operator monitoring workstation 20 and/or other application programs for additional processing or perusal.

The Intelligent Remote Agent 18 can be distinguished from its predecessor, the DataProbe, which is a Non-Intelligent Remote Agent (NIRA). DataProbes use SQL to insert data a row at a time into a Data Server 14. There is generally one DataProbe process for each table, although this does not have to be the case. In addition, DataProbes insert their data on fixed intervals controlled by a configuration file located on the associated computer system 12.

In contrast to DataProbes, Intelligent Remote Agents 18 use Remote Procedure Calls (RPC) to communicate with the Proxy Controller 16, and thus do not require an SQL services library. Further, by using RPC rather than SQL, the Intelligent Remote Agents 18 are not restricted by SQL limitation that allow the insertion of only one row at a time into the Data Server 14. As a result, the Intelligent Remote Agent 18 can return data of any size to the Proxy Controller 16 for storage into the Data Server 14.

Unlike DataProbes, Intelligent Remote Agents 18 return responses on a sampling interval or event occurrence controlled by the requester, and not on a fixed interval rigidly determined by configuration files and the like. In addition, Intelligent Remote Agents 18 can respond with only requested data to the Data Server 14, filtering out unrequested data, thereby reducing traffic on the network 10 and minimizing contention for the Data Server 14.

A computer system 12 can be monitored by any number of Intelligent Remote Agents 18, wherein each Intelligent Remote Agent 18 collects specific data for a specific table and each Intelligent Remote Agent 18 has its own collection interval. Thus, the Intelligent Remote Agents 18 are smaller than DataProbes, use a more efficient communications mechanism, collect data on sampling intervals or event occurrences controlled by the requester, and filter the information before returning it to a Proxy Controller 16.

When an Intelligent Remote Agent 18 initializes, it queries the global location broker for the Proxy Controller 16 having the same cell name. If the Intelligent Remote Agent 18 finds a Proxy Controller 16 with the same cell name, it informs the Proxy Controller 16 that it is operational and ready to accept commands. If the Intelligent Remote Agent 18 cannot find an associated Proxy Controller 16, it "sleeps" for some period of time and then tries again to locate a Proxy Controller 16. This sequence continues until the Intelligent Remote Agent 18 finds an associated Proxy Controller 16. Using cell names in this manner isolates the Intelligent Remote Agents 18 from the particular location of a Proxy Controller 16 and Data Server 14. Thus, the Data Server 14 and Proxy Controller 16 can be moved easily from one computer system 12 to another.

Once an Intelligent Remote Agent 18 has found an associated Proxy Controller 16 in its cell and has informed the Proxy Controller 16 that it is operational, the Proxy Controller 16 transmits commands to initiate a "heartbeat" monitoring function on the Intelligent Remote Agent 18. At some specified interval, e.g., 10 minutes, the Intelligent Remote Agent 18 sends a heartbeat monitoring response to the Proxy Controller 16 to indicate that it is still operational. In this way, even if there are no situations being monitored by the Intelligent Remote Agent 18, the Proxy Controller 16 can still determine whether the Intelligent Remote Agent 18 is still operational.

The first time a heartbeat monitoring response is returned by an Intelligent Remote Agent 18, the Proxy Controller 16 inserts data identifying the Intelligent Remote Agent 18 into a special table in the Data Server 14 called a nodelist. The nodelist table provides a central directory of Intelligent Remote Agents 18, for use by other applications, so that the applications know which Proxy Controller 16 to communicate with in order to request data from a particular Intelligent Remote Agent 18. The nodelist table may be accessed from the operator monitoring workstation 20 or any other application program.

The heartbeat monitoring response indicates that an Intelligent Remote Agent 18 is operational and allows situation monitoring (SITMON) functions to be assigned to that Intelligent Remote Agent 18. If, for some reason, the Intelligent Remote Agent 18 stops communicating with a Proxy Controller 16, it no longer returns a heartbeat monitoring response, and when the heartbeat monitoring interval expires, the Proxy Controller 16 indicates in the nodelist table that the Intelligent Remote Agent 18, and its associated computer system 12, are non-operational.

If the Intelligent Remote Agent 18 is, in fact, operational, but simply cannot communicate with the Proxy Controller 16, e.g., during a network 10 outage of some kind, the Intelligent Remote Agent 18 attempts to send heartbeat monitoring responses and possibly other data during the outage, but will not be able to communicate with the Proxy Controller 16. If this happens, the Intelligent Remote Agent 18 behaves exactly as if the Proxy Controller terminated 18.

If the Intelligent Remote Agent 18 cannot communicate with the Proxy Controller 16, it assumes, after a certain number of retries, that the Proxy Controller 16 has terminated. The Intelligent Remote Agent 18 then proceeds to discard all outstanding commands and re-initializes in the same manner as described above, wherein the Intelligent Remote Agent 18 queries the global location broker for the Proxy Controller 16 that matches its cell name, and then informs the Proxy Controller 16 that it is operational and ready to accept requests. If the Intelligent Remote Agent 18 cannot find an associated Proxy Controller 16, it "sleeps" for some period of time and then tries again to locate a Proxy Controller 16. This sequence continues until the Intelligent Remote Agent 18 finds an associated Proxy Controller 16. After the Proxy Controller 16 restarts, and the Intelligent Remote Agent 18 reconnects to the Proxy Controller 16, the Proxy Controller 16 retransmits the commands for all pending situation monitoring requests, including the heartbeat monitoring function, and report requests.

If the Intelligent Remote Agent 18 aborts or otherwise terminates, then, after being restarted, it attempts to connect again with the Proxy Controller 16 during its initialization. As described above, the Proxy Controller 16 re-transmits commands for all pending situation monitoring and report requests to the Intelligent Remote Agent 18, in addition to the heartbeat monitoring function.

PERFORMANCE MONITORING FUNCTIONS

In the present invention, there are two ways to collect performance data from Intelligent Remote Agents 18: (1) transmitting commands for a situation monitoring request to a particular Intelligent Remote Agent 18 on a particular computer system 12; or (2) transmitting commands for a report request to a particular Intelligent Remote Agent 18 on a particular computer system 12. In both cases, the commands are transmitted from the Proxy Controller 16 to the Intelligent Remote Agent 18 and the response is returned by the Intelligent Remote Agent 18 to the Proxy Controller 16 and Data Server 14.

For example, the Data Server 14 may include predefined, automatically-initiated, situation monitoring requests that are transmitted to the Proxy Controller 18 upon initialization of Data Server 14 and the Proxy Controller 16. The Proxy Controller 16 analyzes the situation monitoring request, extracts predicates and sampling intervals or event occurrences therefrom, and generates one or more command sequences for the Intelligent Remote Agents 18. The predicates, which are analogous to SQL predicates, indicate the specific items of performance data to be collected. The sampling intervals, which are analogous to timers, indicate the specific time periods for collecting the items of performance data. The event occurrences, which are analogous to interrupts, indicate the specific event indication or occurrence that triggers the collection of performance data. The command sequences are then transmitted to the specified Intelligent Remote Agents 18. Thereafter, no more commands are transmitted to the Intelligent Remote Agent 18 concerning the specific situation monitoring request, unless the Proxy Controller 16 transmits a "quit" command instructing the Intelligent Remote Agent 18 to end the specific situation monitoring request.

Thereafter, all communications from the Intelligent Remote Agent 18 to the Proxy Controller 16 occur on the sampling interval or event occurrence (if there is any data to return). The only exception is in the case of report requests, where a command sequence for a report request is transmitted to the Intelligent Remote Agent 18 each time the request is made, e.g., when an operator on the operation monitoring workstation 20 selects a initial view of the performance data or refreshes the currently displayed view of the performance data.

The Intelligent Remote Agent 18 collects the desired data at the specified sampling interval or event occurrence, and determines whether the collected data satisfies any of the situation predicates. Any collected data that satisfies the situation predicates is returned to the Proxy Controller 16, and is then transmitted to the Data Server 14 for storage therein.

There are two things in particular to note about the operation of an Intelligent Remote Agent 18. First, the Intelligent Remote Agent 18 executes asynchronously from the Proxy Controller 16 and the Data Server 14. Similarly, the Proxy Controller 16 stores returned data from the Intelligent Remote Agent 16 until the Data Server 14 asks for it (by executing instructions associated with a situation monitoring function at its sampling interval or event occurrence, for instance). Also, note that if the commands for a situation monitoring request are transmitted to multiple Intelligent Remote Agents 18, then each of the Intelligent Remote Agents 18 collect data asynchronously.

Second, note that the Intelligent Remote Agent 18 returns the collected data to the Proxy Controller 16 if the data satisfies any of the situation predicates (rather than satisfying all of the situation predicates). The Data Server 14 later verifies that all situation predicates are satisfied. This technique can result in slightly more traffic on the network 10, but operations of the Intelligent Remote Agents 18 are greatly simplified. Since the main purpose of Intelligent Remote Agents 18 is to avoid running a Data Server 14 on each managed computer system 12, the preferred embodiment of the present invention uses the Intelligent Remote Agents 18 to perform only partial predicate processing, with the Data Server 14 performing full predicate processing.

The other way to communicate with the Intelligent Remote Agents 18 is more direct. Instead of developing situation monitoring requests, i.e., to watch for interesting events to occur, report requests can be used to monitor a computer system 12. The Data Server 14 uses distributed SQL in the report request to request data from the Proxy Controller 16. The Proxy Controller 16 transmits commands for the report request to the Intelligent Remote Agent 18 on the computer system 12 and then waits for a response. When the Intelligent Remote Agent 18 returns the data, the Proxy Controller 16 transmits the data back to the Data Server 14. This differs from situation monitoring functions, because it is a synchronous operation, i.e., the Data Server 14 waits for a response from the Proxy Controller 16, which waits for a response from the Intelligent Remote Agent 18. Thus, once the collected data is returned to the Proxy Controller 16 from the Intelligent Remote Agent 18, the collected data is immediately sent to the Data Server 14, which in turn immediately responds to the requester.

Generally, report requests do not require predicates, so the Intelligent Remote Agent 18 sends all available data in its response without filtering the data. This can result in the transmission of a large amount of data and thus will provide more immediate data than situation monitoring requests, but it can also be slow and result in increased traffic on the network 10.

Once a report has been requested and then later is refreshed, further responses should be much faster than the response to the initial report request, because the Proxy Controller 16 is already communicating with the Intelligent Remote Agent 18 and the Data Server 14 already knows how to respond to the requester. The only delay is the communication from the Proxy Controller 16 to the Intelligent Remote Agent 18 and back to the Proxy Controller 16.

COMPONENT STRUCTURE AND LOGIC

Figure 2:
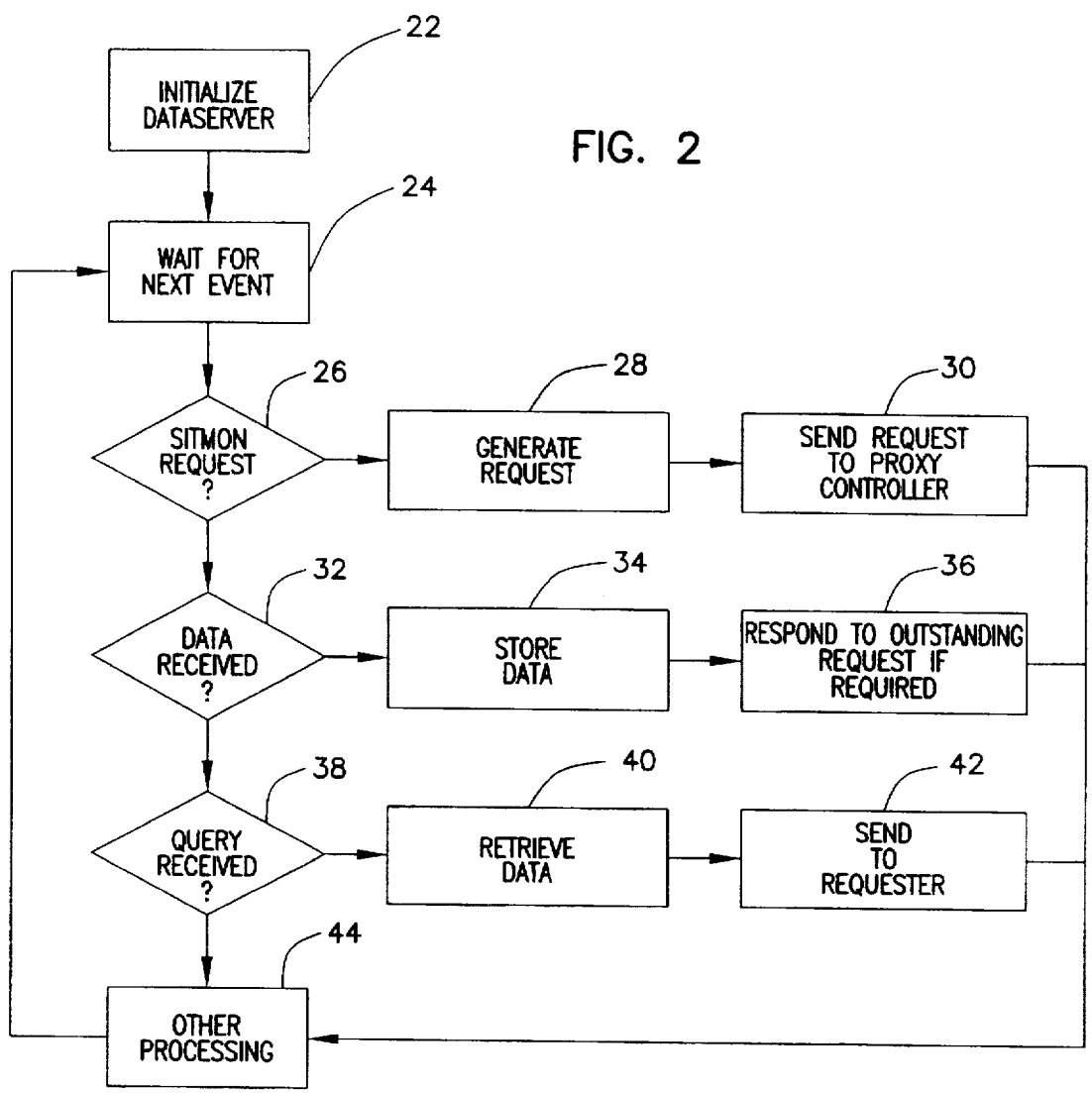
Figure 3:
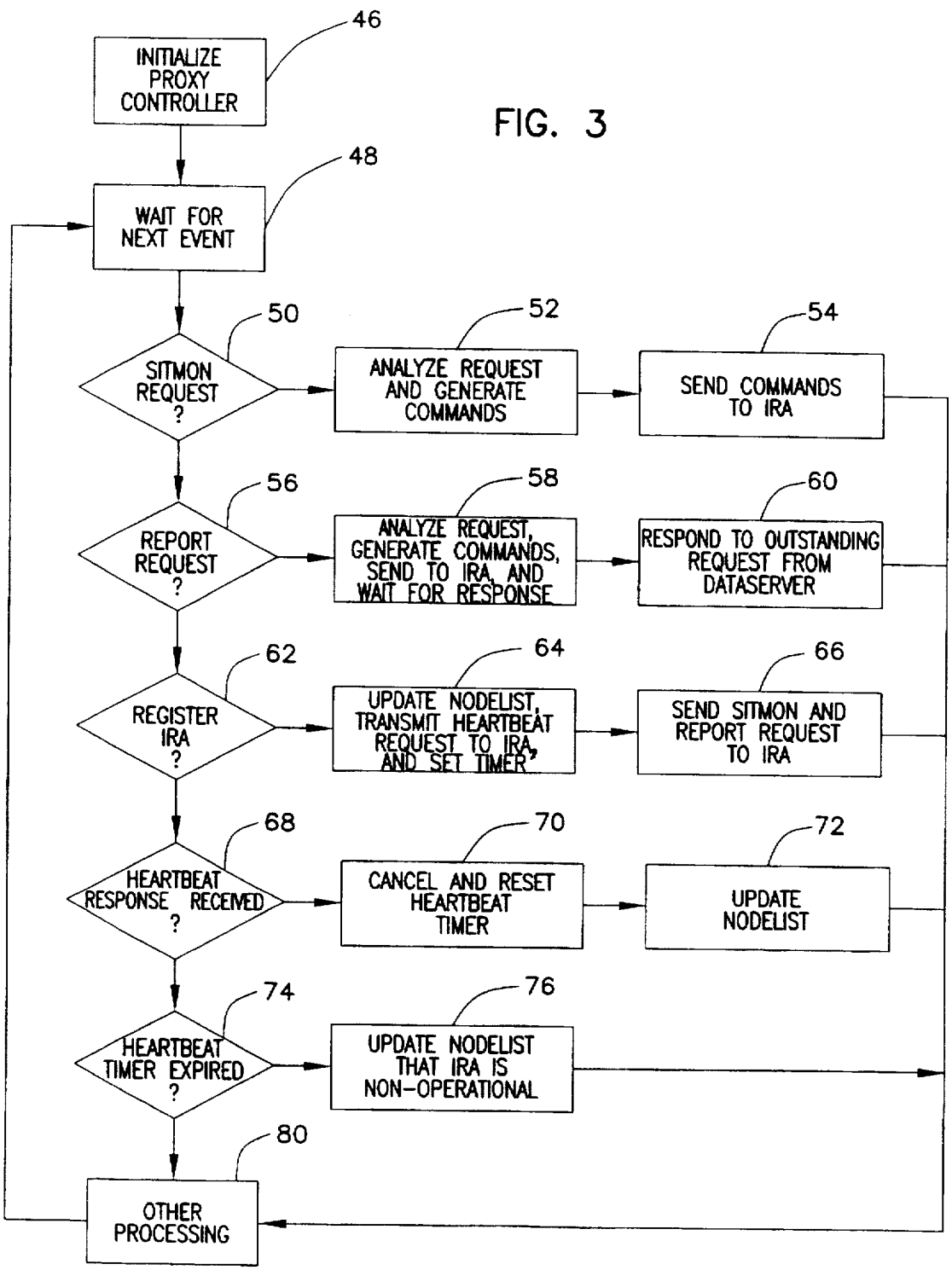

FIGS. 2–4 are flow charts illustrating the structure and logic for each of the components, wherein FIG. 2 represents the steps performed by the Data Server 14, FIG. 3 represents the steps performed by the Proxy Controller 16, and FIG. 4 represents the steps performed by the Intelligent Remote Agent 18.

Referring to FIG. 2, block 22 represents the initialization of the Data Server 14, which may include the generation of pre-defined situation monitoring (SITMON) requests, wherein the Data Server 14 transmits the requests to the Proxy Controller 16. Block 24 represents the Data Server 14 waiting for the next event to occur. Thereafter, upon the occurrence of an event, the remaining blocks 26–44 in the flow chart are performed.

Block 26 is a decision block that represents the Data Server 14 determining whether the event is a situation monitoring (SITMON) request, which may have been received, for example, from the operator monitoring workstation 20 or other application. If so, block 28 represents the Data Server 14 generating the situation monitoring request. Block 30 represents the Data Server 14 sending the situation monitoring request to the Proxy Controller 16.

Block 32 is a decision block that represents the Data Server 14 determining whether it received data from the Proxy Controller 16. If so, block 34 represents the Data Server 14 storing the data and block 36 represents the Data Server 14 responding to any outstanding request for such data, e.g., from the operator monitoring workstation 20 or other application.

Block 38 is a decision block that represents the Data Server 14 determining whether it received a database query from a requester, e.g., the operator monitoring workstation 20 or other application program. If so, block 40 represents the Data Server 14 retrieving data and block 42 represents the Data Server 14 sending the retrieved data to the requester.

Block 44 represents the Data Server 14 performing all other functions.

Referring to FIG. 3, block 46 represents the initialization of the Proxy Controller 16. Block 48 represents the Proxy Controller 16 waiting for the next event to occur. Thereafter, upon the occurrence of an event, the remaining blocks 50–80 in the flow chart are performed.

Block 50 is a decision block that represents the Proxy Controller 16 determining whether it received a situation monitoring (SITMON) request from the Data Server 14. If so, block 52 represents the Proxy Controller 16 analyzing the situation monitoring request and generating the appropriate commands for the Intelligent Remote Agent 18. Block 54 represents the Proxy Controller 16 transmitting those commands to the Intelligent Remote Agent 18.

Block 56 is a decision block that represents the Proxy Controller 16 determining whether it received a report request from the Data Server 14. If so, block 58 represents the Proxy Controller 16 analyzing the report request, generating the appropriate commands for the request, transmitting the commands to the Intelligent Remote Agent 18, and then waiting for a response from the Intelligent Remote Agent 18. Block 60 represents the Proxy Controller 16 responding to the outstanding request from the Data Server 14 with the response, i.e., data, returned by the Intelligent Remote Agent 18.

Block 62 is a decision block that represents the Proxy Controller 16 determining whether the event is a message registering the Intelligent Remote Agent 18. If so, block 64 represents the Proxy Controller 16 updating the nodelist table in the Data Server 14, transmitting commands for a heartbeat monitoring function to the Intelligent Remote Agent 18, and setting a heartbeat monitoring timer for the response from the Intelligent Remote Agent 18. Block 66 represents the Proxy Controller 16 generating commands for pending situation monitoring (SITMON) and report requests and transmitting those commands to the Intelligent Remote Agent 18.

Block 68 is a decision block that represents the Proxy Controller 16 determining whether a heartbeat monitoring response was received from an Intelligent Remote Agent 18. If so, block 70 represents the Proxy Controller 16 cancelling the current heartbeat monitoring timer and resetting it for another interval. Block 72 represents the Proxy Controller 16 updating the nodelist table in the Data Server 14 to indicate that the Intelligent Remote Agent 18 is operational.

Block 74 is a decision block that represents the Proxy Controller 16 determining whether a heartbeat monitoring timer has expired. If so, block 76 represents the Proxy Controller 16 updating the nodelist table in the Data Server 14 to indicate that the Intelligent Remote Agent 18 is non-operational.

Block 80 represents all other processing for the Proxy Controller 16.

Referring now to FIG. 4, block 82 represents the initialization of the Intelligent Remote Agent 18. Block 84 represents the Intelligent Remote Agent 18 waiting for the next event to occur. Thereafter, upon the occurrence of an event, the remaining blocks 86–110 in the flow chart are performed.

Block 86 is a decision block that represents the Intelligent Remote Agent 18 determining whether it received commands for a situation monitoring (SITMON) request from a Proxy Controller 16. If so, block 88 represents Intelligent Remote Agent 18 determining the predicate and sampling interval or event occurrence from the commands. Block 90 represents the Intelligent Remote Agent 18 collecting and filtering the desired data (if any), responding to the commands by transmitting the collected and filtered data to the Intelligent Remote Agent 16, and then optionally setting a timer for the sampling interval.

Block 92 is a decision block that represents the Intelligent Remote Agent 18 determining whether it received commands for a report request from the Proxy Controller 16. If so, block 94 represents the Intelligent Remote Agent 18 collecting the desired data and block 96 represents the Intelligent Remote Agent 18 responding to the commands by returning the collected data to the Proxy Controller 16.

Block 98 is a decision block that represents the Intelligent Remote Agent 18 determining whether a timer has expired. If so, block 100 represents the Intelligent Remote Agent 18 collecting and filtering data using the predicate associated with the sampling interval. Block 102 represents the Intelligent Remote Agent 18 returning the collected and filtered data (if any) to the Proxy Controller 16.

Block 104 is a decision block that represents the Intelligent Remote Agent 18 determining whether a specified event occurrence or indication has occurred. If so, block 106 represents the Intelligent Remote Agent 18 collecting and filtering data using the predicate associated with the event occurrence. Block 108 represents the Intelligent Remote Agent 18 sending the collected and filtered data (if any) to the Proxy Controller 16.

Block 110 is a decision block that represents the Intelligent Remote Agent 16 determining whether it received a "quit" command from the Proxy Controller 16, wherein the quit command is associated with a previously received command for a specified situation monitoring request. If so, block 112 represents the Intelligent Remote Agent 18 cancelling the sampling interval timer associated with the quit command and block 114 represents the Intelligent Remote Agent 18 responding to the Proxy Controller 16.

Block 116 represents all other processing performed by the Intelligent Remote Agent 18.

EXEMPLARY OPERATION

To further illustrate the present invention, an example of the operation of the present invention is described, comprising a configuration of one Data Server 14, a Proxy Controller 16, and two Intelligent Remote Agents 18. In this example, one of the Intelligent Remote Agents 18 is running on the same computer system 12 as the Data Server 14, which has the host name "Server #1". Another of the Intelligent Remote Agents 18 is running on another computer system 12, which has a host name of "Server #2". All of these components are assigned to a cell named "Candle."

At startup, scripts are run on both Server #1 and Server #2 to start the various components. The Intelligent Remote Agent 18 on Server #2 starts first, because Server #1 needs to bring up a global location broker, Data Server 14, Proxy Controller 16, and Intelligent Remote Agent 18. The Intelligent Remote Agent 18 on Server #2 then starts and queries the global location broker for the location of the associated Proxy Controller 16. If the Proxy Controller 16 has not started yet, then the Intelligent Remote Agent 18 "sleeps" for a minute or so.

After the Intelligent Remote Agent 18 on Server #1 is started, it queries the global location broker for the associated Proxy Controller 16, is returned the location of the Proxy Controller 16, and verifies that the cell name of the Proxy Controller 16 is "candle." The Intelligent Remote Agent 18 sends its host name, Server #1, and a description of the type of monitoring it is capable of (called an affinity) to the Proxy Controller 16. The Proxy Controller 16 then initiates a heartbeat monitoring function for the Intelligent Remote Agent 18. After a heartbeat monitoring response is received from the Intelligent Remote Agent 18, the nodelist table is updated, which is used to inform the operator monitoring workstation 20 or other applications that the Intelligent Remote Agent 18 on Server #1 is operational.

Later, the Intelligent Remote Agent 18 on Server #2 wakes up and queries the global location broker. From the global location broker, the Intelligent Remote Agent 18 finds the Proxy Controller 16 that is registered with the cell name of "Candle" and sends its host name, Server #2, along with its affinity to the Proxy Controller 16. The Proxy Controller 16 initiates the heartbeat monitoring function and thereafter, after receiving a response, updates the nodelist table to show that the Intelligent Remote Agent 18 on Server #2 is operational.

Thereafter, an operator on the operator monitoring workstation 20 issues a situation monitoring request to determine whether any processes running on Server #1 or Server #2 are using an inordinate amount of CPU time, i.e., greater than some threshold value or percentage. The request is transmitted to the Data Server 14, which in turn forwards it to the Proxy Controller 16. The Proxy Controller 16 creates one or more commands for the request containing a predicate and sampling interval. The Proxy Controller 16 then transmits the commands to the Intelligent Remote Agents 18 on Server #1 and Server #2.

Assume that just as the commands are being transmitted to the Intelligent Remote Agents 18, there is an outage on the network 10 isolating Server #2 from Server #1. As a result, only the Intelligent Remote Agent 18 on Server #1 receives the commands (since the commands were not transmitted across the network 10). The Intelligent Remote Agent 18 on Server #1 responds back to the Proxy Controller 16 to inform the Proxy Controller 16 that the commands were successfully received.. However, the Intelligent Remote Agent 18 on Server #2 never receives the commands and thus never responds. Meanwhile, the Proxy Controller 16 checks every minute or so to see if a response was received from the Intelligent Remote Agent 18 on Server #2. When no response is received, the Proxy Controller 16 re-sends the commands again. If the Intelligent Remote Agent 16 on Server #2 does not respond within some number of retries, the Proxy Controller 16 changes the status for the Intelligent Remote Agent 16 in the nodelist table to nonoperational. Assume, however, that before the status can be changed, the network 10 is restored, the Intelligent Remote 16 on Server #2 receives the commands and responds back to the Proxy Controller 16.

During these events, the Data Server 14 and Proxy Controller 16 continue with their normal processing. The Data Server 14 queries the Proxy Controller 16 for process information and the Proxy Controller 16 responds to the Data Server 14 with an indication that it has no process information (yet). This result may occur, for example, because processing by the Data Server 14 operates asynchronously from data collection by the Intelligent Remote Agent 18.

The Intelligent Remote Agents 18 also perform data collection independently of each other. Since the Intelligent Remote Agent 18 on Server #1 received the commands for the situation monitoring request without any disruptions, it immediately began data collection to determine whether any processes running on Server #1 are using an inordinate amount of CPU time, i.e., greater than some threshold value or percentage. Finding none, the Intelligent Remote Agent 18 then initiates a timer to perform such data collection again after the elapsed sampling interval.

Later, after the network 10 is restored, the Intelligent Remote Agent 18 on Server #2 also determines whether any processes running on Server #2 are using an inordinate amount of CPU time, i.e., greater than some threshold value or percentage. If such a process exists, the Intelligent Remote Agent 18 on Server #2 immediately sends the collected data to the Proxy Controller 16, which stores the data until the Data Server 14 requests the collected data again.

The Data Server 14 requests the collected data again, after the expiration of its defined interval. At that time, the Proxy Controller 16 returns the collected data (typically in one or more rows of a relational database table) provided to it by the Intelligent Remote Agent 18 on Server #2 to the Data Server 14, causing the Data Server 14 to respond to the situation monitoring request and display the data on the operator monitoring workstation 20. These activities continue for the remainder of the day.

Later that evening, Server #2 needs to be shutdown to install new equipment. Since the installation takes longer than 10 minutes, the heartbeat monitoring response from the Intelligent Remote Agent 16 on Server #2 is not received by the Proxy Controller 16 (because the Intelligent Remote Agent 16 on Server #2 is no longer operational), and the Proxy Controller 16 sets the status for the Intelligent Remote Agent 16 on Server #2 in the nodelist table to nonoperational, which may result in the operator monitoring workstation 20 being alerted as well and prevents any new situation monitoring requests from being assigned to the Intelligent Remote Agent 18 on Server #2.

Once Server #2 and the Intelligent Remote Agent 18 are restarted, the Intelligent Remote Agent 18 on Server #2 performs its initialization steps again, determining that the Proxy Controller 16 on Server #1 is assigned the cell name "candle." The Remote Intelligent Agent 16 on Server #2 then transmits its host and affinity message to the Proxy Controller 16. After receiving the message, the Proxy Controller 16 starts a heartbeat monitoring function and changes the status in the nodelist table to indicate that the Intelligent Remote Agent 18 is operational. The Proxy Controller 16 then re-transmits the commands for the pending situation monitoring request to determine whether any processes running on Server #2 are using an inordinate amount of CPU time, i.e., greater than some threshold value or percentage.

At some time thereafter, the operator creates another situation monitoring request for the Intelligent Remote Agents 16 on both Server #1 and Server #2. This situation monitoring request determines whether any processes are using an inordinate amount of memory on either Server #1 or Server #2. The commands for the request are distributed, via the Proxy Controller 16, to the Intelligent Remote Agents 16 as described above, but without any outage of the network 10.

At this time, there are two situations being monitored on each of the Intelligent Remote Agents 18. Each Intelligent Remote Agent 18 has two active sampling interval timers, one for each request, and the Intelligent Remote Agents 18 return the collected data to the Proxy Controller 16 after each timer expires.

The operator can create any number of situation monitoring requests for any of the Intelligent Remote Agents 18, wherein each request has its own timer and predicates and continues running until the operator ends the situation monitoring request. Report requests are handled in a similar manner, except they have no sampling interval, and the collected data is immediately returned to the Proxy Controller 16.

CONCLUSION

This concludes the description of the preferred embodiment of the invention. In summary, a network monitoring system has been described, wherein the network monitoring system is comprised of one or more Intelligent Remote Agents, a Data Server, and a Proxy Controller. The Intelligent Remote Agents receive commands instructing them to collect performance data on the Agent's associated computer system, wherein the commands comprise predicates for filtering the performance data and a sampling interval. The Data Server generates requests for performance data and stores the collected performance data returned in response to the requests. The Proxy Controller translates the requests generated by the Data Server into the commands for the Intelligent Remote Agents. The Proxy Controller also transmits the commands to the Intelligent Remote Agents, accumulates the collected performance data returned from the Intelligent Remote Agents, and forwards the collected performance data to the Data Server for storage therein.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A network monitoring system, comprising:
   (a) a network interconnecting a plurality of computer systems;
   (b) one or more intelligent remote agents, each executed by one of the computer systems in the network, for receiving commands for collecting performance data on the agent's associated computer system, for collecting the performance data in accordance with the received commands, and for responding to the commands with the collected performance data, wherein the commands comprise predicates for filtering the performance data;
   (c) a data server, executed by one of the computer systems in the network, for generating requests for performance data and for storing the collected performance data returned in response to the requests; and
   (d) a proxy controller, executed by one of the computer systems in the network, for translating the requests generated by the data server into the commands for the intelligent remote agents, for transmitting the commands to the intelligent remote agents, for accumulating the collected performance data returned from the intelligent remote agents in response to the transmitted commands, and for forwarding the collected performance data to the data server for storage therein.

2. The network monitoring system of claim 1, wherein a plurality of the intelligent remote agents monitor a specific one of the computer systems.

3. The network monitoring system of claim 2, wherein each of the intelligent remote agents collects different performance data for the specific one of the computer systems.

4. The network monitoring system of claim 2, wherein each of the intelligent remote agents has its own specified sampling interval.

5. The network monitoring system of claim 2, wherein each of the intelligent remote agents collect the performance data upon occurrence of an event specified by a requester.

6. The network monitoring system of claim 1, wherein the data server includes a relational database for storing the collected performance data.

7. The network monitoring system of claim 6, wherein the data server is equipped with one or more data retrieval engines for querying the relational database.

8. The network monitoring system of claim 1, wherein the data servers, proxy controllers, and intelligent remote agents are organized by cell.

9. The network monitoring system of claim 8, wherein the cell is identified by a symbolic name.

10. The network monitoring system of claim 1, wherein the intelligent remote agents further comprise means for filtering the collected performance data using the predicates specified by the requester.

11. The network monitoring system of claim 10, wherein the intelligent remote agents further comprise means for executing one or more specified instructions in response to the filtered data.

12. The network monitoring system of claim 1, wherein the intelligent remote agent further comprises means for returning the collected data to the proxy controller when the data satisfies any of the situation predicates.

13. The network monitoring system of claim 12, wherein the data server further comprises means for verifying that all of the situation predicates are satisfied in the collected data.

14. The network monitoring system of claim 1, wherein data is stored in the data server and retrieved therefrom by an operator monitoring workstation.

15. The network monitoring system of claim 1, further comprising a hub data server that accumulates data from other data servers.

16. The network monitoring system of claim 1, wherein a plurality of the intelligent remote agents communicate with the same proxy controller, thereby providing scalability.

17. The network monitoring system of claim 1, wherein the intelligent remote agents further comprise means for using remote procedure calls (RPC) to communicate with the proxy controller.

18. The network monitoring system of claim 1, wherein the intelligent remote agents further comprise means for returning data of any size to the proxy controller for storage into the data server.

19. The network monitoring system of claim 1, wherein the performance data comprises trending data for the associated computer system.

20. The network monitoring system of claim 1, wherein the performance data comprises historical data for the associated computer system.

21. The network monitoring system of claim 1, wherein the intelligent remote agents further comprise means for collecting the performance data at a sampling interval specified by a requester.

22. The network monitoring system of claim 1, wherein the intelligent remote agents further comprise means for collecting the performance data upon occurrence of an event specified by a requester.

23. The network monitoring system of claim 1, wherein the intelligent remote agents further comprise means for executing one or more commands specified by a requester.

24. The network monitoring system of claim 1, wherein the intelligent remote agents execute asynchronously from the proxy controller and the data server.

25. The network monitoring system of claim 1, wherein the intelligent remote agents execute asynchronously from each other.

26. The network monitoring system of claim 1, wherein the proxy controller stores returned data from the intelligent remote agent until the data server asks for it.

27. A method of monitoring a network interconnecting a plurality of computer systems, comprising the steps of:

(a) generating one or more requests for performance data at a data server executed by one of the computer systems in the network and transmitting the request to a proxy controller executed by one of the computer systems in the network;

(b) translating the requests generated by the data server into commands for the intelligent remote agents at the proxy controller, wherein the commands comprise predicates for filtering performance data, and transmitting the commands to one or more intelligent remote agents executed by one or more of the computer systems in the network;

(c) collecting the performance data at the intelligent remote agents in accordance with the received commands, filter the collected performance data at the intelligent remote agents using the predicates within the received commands, and responding to the commands by returning the collected performance data to the proxy controller;

(d) accumulating the collected performance data returned from the intelligent remote agents at the proxy controller, and forwarding the collected performance data from the proxy controller to the data server for storage therein.

28. The method of monitoring a network of claim 27, further comprising the step of monitoring a specific one of the computer systems using a plurality of the intelligent remote agents.

29. The method of monitoring a network of claim 28, further comprising the step of collecting different performance data for the specific one of the computer systems at each of the intelligent remote agents.

30. The method of monitoring a network of claim 28, further comprising the step of using a specified sampling interval at each of the intelligent remote agents.

31. The method of monitoring a network of claim 28, further comprising the step of collecting the performance data upon occurrence of an event specified by a requester at each of the intelligent remote agents.

32. The method of monitoring a network of claim 27, wherein the data server includes a relational database and the method further comprises the step of storing the collected performance data in the relational database.

33. The method of monitoring a network of claim 32, wherein the data server is equipped with one or more data retrieval engines and the method further comprises the step of querying the relational database.

34. The method of monitoring a network of claim 27, further comprising the step of organizing the data servers, proxy controllers, and intelligent remote agents by cell.

35. The method of monitoring a network of claim 34, further comprising the step of identifying the cell by a symbolic name.

36. The method of monitoring a network of claim 27, further comprising the step of filtering the collected performance data at the intelligent remote agents using the predicates specified by the requestor.

37. The method of monitoring a network of claim 36, further comprising the step of executing one or more specified instructions at the intelligent remote agents in response to the filtered data.

38. The method of monitoring a network of claim 27, further comprising the steps of storing data in the data server and retrieving data therefrom using an operator monitoring workstation.

39. The method of monitoring a network of claim 27, further comprising the step of accumulating data from other data servers in a hub data server.

40. The method of monitoring a network of claim 27, further comprising the step of communicating between a plurality of the intelligent remote agents and the same proxy controller, thereby providing scalability.

41. The method of monitoring a network of claim 27, further comprising the step of using remote procedure calls (RPC) to communicate between the intelligent remote agents and the proxy controller.

42. The method of monitoring a network of claim 27, further comprising the step of returning data of any size from the intelligent remote agents to the proxy controller for storage into the data server.

43. The method of monitoring a network of claim 27, wherein the performance data comprises trending data for the associated computer system.

44. The method of monitoring a network of claim 27, wherein the performance data comprises historical data for the associated computer system.

45. The method of monitoring a network of claim 27, further comprising the step of collecting the performance data at the intelligent remote agents at a sampling interval specified by a requestor.

46. The method of monitoring a network of claim 27, further comprising the step of collecting the performance data at the intelligent remote agents upon occurrence of an event specified by a requestor.

47. The method of monitoring a network of claim 27, further comprising the step of executing one or more commands, specified by a requestor at the intelligent remote agents.

48. The method of monitoring a network of claim 27, further comprising the step of executing the intelligent remote agents asynchronously from the proxy controller and the data server.

49. The method of monitoring a network of claim 27, further comprising the step of executing the intelligent remote agents asynchronously from each other.

50. The method of monitoring a network of claim 27, further comprising the step of storing returned data from the intelligent remote agent at the proxy controller until the data server asks for it.

51. The method of monitoring a network of claim 27, further comprising the step of returning the collected data from the intelligent remote agent to the proxy controller when the data satisfies any of the situation predicates.

52. The method of monitoring a network of claim 27, further comprising the step of verifying at the data server that all of the situation predicates are satisfied in the collected data.

53. An article of manufacture, comprising:
a computer readable medium having one or more computer program means embodied therein for monitoring a network interconnecting a plurality of computer systems, the computer program means in said article of manufacture comprising:
intelligent remote agent computer program means, executed by one or more of the computer systems in the network, for receiving commands for collecting performance data on the agent's associated computer system, for collecting the performance data in accordance with the received commands, and for responding to the commands with the collected performance data, wherein the commands comprise predicates for filtering the performance data;
data server computer program means, executed by one or more of the computer systems in the network, for generating requests for performance data and for storing the collected performance data returned in response to the requests; and
proxy controller computer program means, executed by one of the computer systems in the network, for translating the requests generated by the data server into the commands for the intelligent remote agents, for transmitting the commands to the intelligent remote agents, for accumulating the collected performance data returned from the intelligent remote agents in response to the transmitted commands, and for forwarding the collected performance data to the data server for storage therein.

54. The article of manufacture of claim 53, wherein a plurality of the intelligent remote agent computer program means monitor a specific one of the computer systems.

55. The article of manufacture of claim 54, wherein each of the intelligent remote agent computer program means collects different performance data for the specific one of the computer systems.

56. The article of manufacture of claim 54, wherein each of the intelligent remote agent computer program means has its own specified sampling interval.

57. The article of manufacture of claim 54, wherein each of the intelligent remote agent computer program means collect the performance data upon occurrence of an event specified by a requestor.

58. The article of manufacture of claim 53, wherein the data server computer program means includes relational database computer program means for storing the collected performance data.

59. The article of manufacture of claim 58, wherein the data server computer program means is equipped with one or more data retrieval engines for querying the relational database.

60. The article of manufacture of claim 53, wherein the data server computer program means, proxy controller computer program means, and intelligent remote agent computer program means are organized by cell.

61. The article of manufacture of claim 53, wherein the cell is identified by a symbolic name.

62. The article of manufacture of claim 53, wherein the intelligent remote agent computer program means further comprises means for returning the collected data to the proxy controller computer program means when the data satisfies any of the situation predicates.

63. The article of manufacture of claim 62, wherein the data server computer program means further comprises means for verifying that all of the situation predicates are satisfied in the collected data.

64. The article of manufacture of claim 53, wherein data is stored in the data server computer program means and retrieved therefrom by an operator monitoring workstation.

65. The article of manufacture of claim 53, further comprising a hub data server computer program means that accumulates data from other data server computer program means.

66. The article of manufacture of claim 53, wherein a plurality of the intelligent remote agent computer program means communicate with the same proxy controller computer program means, thereby providing scalability.

67. The article of manufacture of claim 63, wherein the intelligent remote agent computer program means further comprise means for using remote procedure calls (RPC) to communicate with the proxy controller computer program means.

68. The article of manufacture of claim 53, wherein the intelligent remote agent computer program means further comprise means for returning data of any size to the proxy controller computer program means for storage into the data server computer program means.

69. The article of manufacture of claim 53, wherein the performance data comprises trending data for the associated computer system.

70. The article of manufacture of claim 53, wherein the performance data comprises historical data for the associated computer system.

71. The article of manufacture of claim 53, wherein the intelligent remote agent computer program means further comprise means for collecting the performance data at a sampling interval specified by a requester.

72. The article of manufacture of claim 53, wherein the intelligent remote agent computer program means further comprise means for collecting the performance data upon occurrence of an event specified by a requestor.

73. The article of manufacture of claim 53, wherein the intelligent remote agent computer program means further comprise means for filtering the collected performance data using the predicates specified by the requestor.

74. The article of manufacture of claim 73, wherein the intelligent remote agent computer program means further comprise means for executing one or more specified instructions in response to the filtered data.

75. The article of manufacture of claim 53, wherein the intelligent remote agent computer program means further comprise means for executing one or more commands specified by a requestor.

76. The article of manufacture of claim 53, wherein the intelligent remote agent computer program means execute asynchronously from the proxy controller computer program means and the data server computer program means.

77. The article of manufacture of claim 53, wherein the intelligent remote agent computer program means execute asynchronously from each other.

78. The article of manufacture of claim 53, wherein the proxy controller computer program means stores returned data from the intelligent remote agent computer program means until the data server computer program means asks for it.

* * * * *